May 20, 1958     C. A. MORGAN     2,835,245
HEATED FISHING ROD HANDLE
Filed May 25, 1956
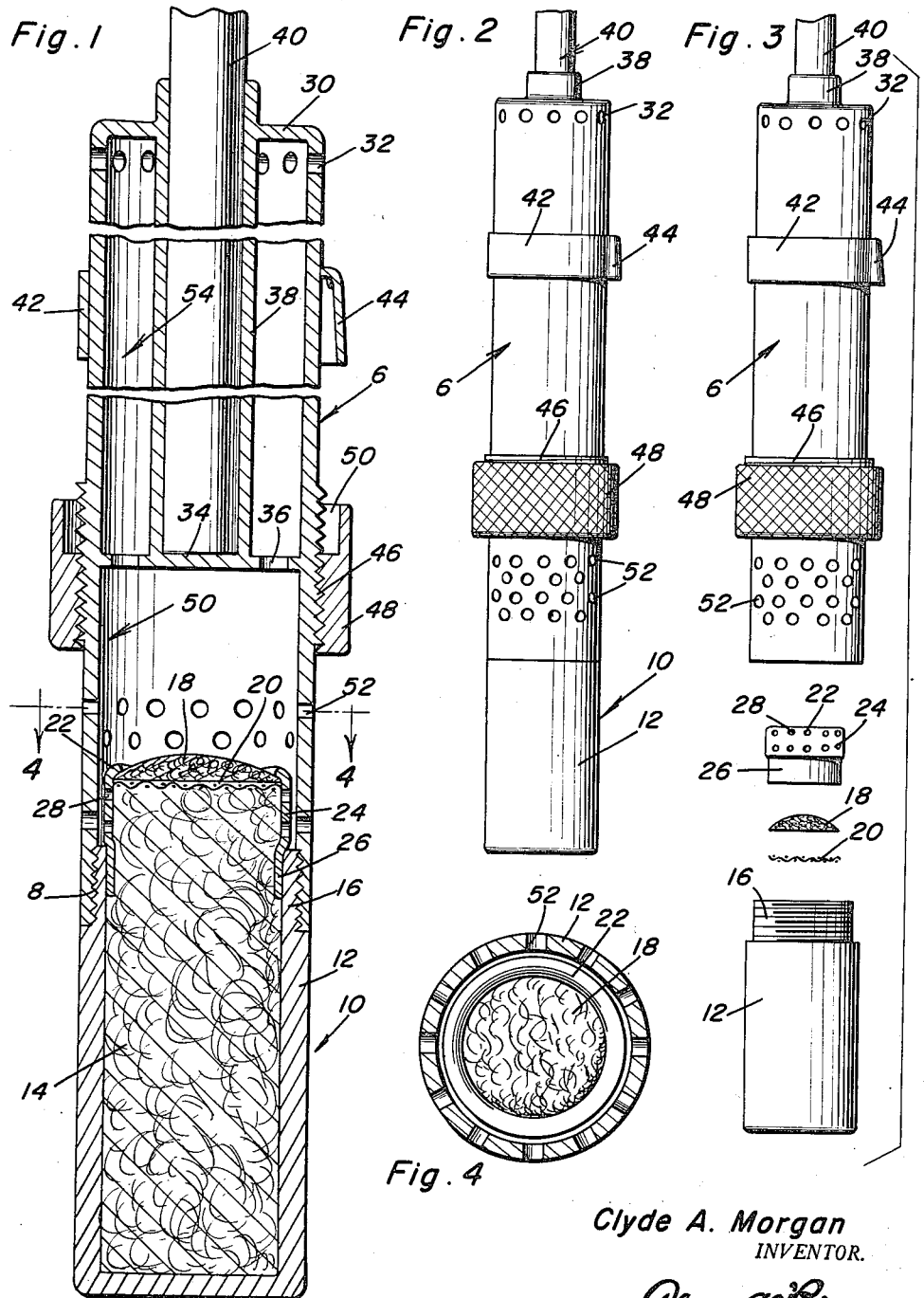
Clyde A. Morgan
INVENTOR.

United States Patent Office 2,835,245
Patented May 20, 1958

2,835,245

HEATED FISHING ROD HANDLE

Clyde A. Morgan, Helena, Calif.

Application May 25, 1956, Serial No. 587,255

2 Claims. (Cl. 126—208)

The present invention relates to an improved handle for a fishing rod, that is, a handle which is improved in that it has heat generating and distributing means therein, whereby to provide a handle which is easy to handle and comfortable while ice fishing or when fishing in a cold climate where cold hands make fishing intolerable.

Briefly, the invention is characterized by a hollow sectional handle having means to receive and hold the end of the rod, a suitably arranged partition and orifices to distribute and circulate heated air, and a readily applicable and removable heater which is carried by the butt of the handle.

More specifically, novelty is predicated on a simple screw threaded case filled with a wad of cotton and having a suitable cap and wick assembly providing a readily attachable and detachable heater which permits utilization and burning of regular lighter fluid and thus provides the source of heat desired and needed.

Other objects, features and advantages will become more readily apparent from the following description and the accompanying sheet of drawings.

In the drawings:

Fig. 1 is a view in section, the rod fragmentarily shown in elevation, of the improved heated handle;

Fig. 2 is an elevational view on a smaller scale;

Fig. 3 is an exploded view showing the details separated; and

Fig. 4 is a section on the line 4—4 of Fig. 1.

The handle is a simple composite structure characterized by two components; namely, the tubular handle proper 6 into which the internally screw threaded end 8 of the heater 10 is threaded. As before mentioned the heater comprises an elongated cup-like case or receptacle 12 which is loaded or charged with cotton wadding 14 which has its upper or outer end slightly reduced and screw threaded as at 16 and screwed into the screw threaded portion 8. The numeral 18 designates a pad-like wick of suitable material which is substantially disk-like and which is fitted against a backing screen 20 which tops the cotton filler or wadding 14 and these parts being held in place by the inturned annular lip 22 on the cap 24. The cap has a reduced neck 26 telescopically fitted into the case. The cap is also provided with suitable air circulating ports 28. The upper or inner end 30 is substantially imperforate and enclosed and adjacent the end 30 heated air circulating ports 32 are provided. On the interior there is a divider or partition 34 also having heated air circulating ports or passages 36. The central sleeve-like member 38 is integrated with the partition 34 and the handle and provides a socket member for reception and retention of the cooperating portion 40 of the fishing rod. A band 42 encircles and is fixed to the intermediate portion of the handle and is provided at a suitable point with a socket member 44. The intermediate portion of the handle 6 is externally screw threaded at 46 to accommodate an internally screw threaded collar 48 which is adjustable on the threads and which has a channeled edge portion 50 wherein the channel provides an endless socket. This cooperates with the socket member 44 and the two together serve to accommodate the base portion of a reel seat. It will be noticed that the partition 34 is approximately intermediate the ends of the handle 6 and that the space 50 between the partition and the point of attachment of the heater means 10 provides a heated air accumulating chamber, the wall of which is provided with suitably positioned air circulating ports or vents 52.

In practice the wadding or filler 14 is saturated with lighter fluid in any convenient manner usually by removing the cap, screen and wick. Then these parts are replaced and the ignitable end is ignited with a match and a small torch, so to speak, is provided. This is screwed into the handle in the manner shown in Fig. 1 and heat radiating therefrom is trapped and circulated by way of the ported partition 34 and space 54 and the heat is discharged by way of the ports 32 thus providing the desired circulation and usable heating comfort.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A handle for a fishing rod comprising a hollow body having an axial socket member at one end for reception of an end portion of a fishing rod and having an apertured partition transverse to and internally arranged to divide the body into a plurality of circulating chambers, the inner end of said socket being joined to the central portion of said partition, the wall portions of said chambers having a plurality of venting and circulating ports, said body being open and internally screw threaded at its opposite end, and a heater unit screwed into said screw threaded end, said unit being of cartridge-like construction and comprising an imperforate case closed at its bottom and open at its top and filled with cotton wadding, a screen seated atop said cotton wadding, a wick superimposed on said screen, an assembling and retaining cap for said screen and wick, said cap having a lower end portion telescopically and removably fitted into the upper end portion of said case and having an apertured upper portion encasing a portion of the cotton wadding and the marginal edge portions of the screen and wick, respectively, and also having a lateral turned-in lip overhanging the marginal edge portion of said wick and retaining said wick and screen in co-operating relation with each other as well as with said cotton wadding.

2. A handle for a fishing rod comprising an elongated hollow cylindrical body member having an interiorly and transversely disposed partition situated at the median portion and interiorly and dividing the hollow portion into upper and lower air circulating chambers, the central portion of said partition being imperforate and the marginal portion having circulating ports therein, a sleeve joined at its lower end to the imperforate portion of said partition and having its upper end extending through the corresponding end of the body member and defining a socket member for reception and retention of an end portion of a fishing rod, said sleeve being of a cross-section less than the cross-section of the body member, being axial in relation to said body member and providing an unobstructed air flow space between the socket member and body member, the upper end of the body member having air circulating ports, the lower end portion of said body member being internally screw threaded and provided with air circulating ports, and a cartridge like heater unit comprising an imperforate case closed at its lower end and open at its upper end and provided at its upper end with screw threads screwed into the screw threads at the lower end of said body member, said case providing a cup-like receiver and being filled with cotton wadding, a screen seated atop the cotton wadding, a wick superimposed on said screen, and a cap telescoping into the lower end portion of said lower chamber, said cap being provided with air circulating ports, the lower end of said cap being removably mounted in the upper end portion of said case, and said cap enclosing and serving to assemble and maintain the wick, screen and cotton wadding in cooperation relationship.

References Cited in the file of this patent

UNITED STATES PATENTS

| | | |
|---|---|---|
| 440,849 | Nesmith | Nov. 18, 1890 |
| 835,150 | Bowditch | Nov. 6, 1906 |
| 2,746,138 | Smith | May 22, 1956 |
| 2,758,592 | Phipps | Aug. 14, 1956 |